United States Patent
Smith

(10) Patent No.: US 8,577,648 B1
(45) Date of Patent: Nov. 5, 2013

(54) SIMULATING FLUID FLOW AT A MOVING BOUNDARY

(75) Inventor: Richard W. Smith, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 284 days.

(21) Appl. No.: 13/066,855

(22) Filed: Apr. 11, 2011

(51) Int. Cl.
  *G06F 7/60* (2006.01)
  *G06F 17/10* (2006.01)
  *G06G 7/50* (2006.01)
  *G06T 15/00* (2011.01)
  *G06T 17/00* (2006.01)

(52) U.S. Cl.
  USPC .................... 703/2; 703/9; 345/419; 345/420

(58) Field of Classification Search
  USPC ................................. 703/2, 9; 345/419, 420
  See application file for complete search history.

(56) References Cited

U.S. PATENT DOCUMENTS

2005/0032029 A1* 2/2005 Trunk ........................... 434/300

OTHER PUBLICATIONS

Richard W. Smith, NPL, "A Classical Elasticity-Based Update Method for Moving and Deforming Meshes", Jan. 2010.*
Martin Engel, NPL, "Flow simulation on moving boundary-fitted grids and application to fluid-structure interaction problems", 2004.*
Auro Ashish Saha, NPL, "Modeling and Simulation of Microscale Flows", 2008.*

* cited by examiner

*Primary Examiner* — Omar Fernandez Rivas
*Assistant Examiner* — Angel Calle
(74) *Attorney, Agent, or Firm* — James T. Shepard

(57) ABSTRACT

A method of simulating fluid flow in a three-dimensional volume with a moving boundary is presented. The moving boundary is provided within a computational fluid dynamics (CFD) mesh. The CFD mesh includes mesh points defining three-dimensional mesh cells. Locations of the mesh points at the moving boundary are revised predicated on known motion characteristics thereof such that the CFD mesh undergoes distortion near the moving boundary. The distortion is minimized using an elastic deformation model that does not involve dimensional physical parameters. As a result, a revised CFD mesh is generated. A fluid flow simulation is then computed for the three-dimensional volume using the revised CFD mesh.

7 Claims, 1 Drawing Sheet

SIMULATING FLUID FLOW AT A MOVING BOUNDARY

ORIGIN OF THE INVENTION

The invention described herein may be manufactured and used by or for the Government of the United States of America for Governmental purposes without payment of any royalties thereon or therefore.

FIELD OF THE INVENTION

The invention relates generally to fluid flow simulation, and more particularly to a method of simulating fluid flow in a three-dimensional volume with a moving boundary.

BACKGROUND OF THE INVENTION

Over the past several decades, one class of problems in computational fluid dynamics (CFD) that has undergone substantial development involves movement of the fluid domain boundary. The problem class exists when the fluid domain boundary is either explicitly time-dependant or is known a priori and determined as part of a flow solution in a coupled fashion. Free-surface, fluid-structure interaction, and forced-motion flows are typical of problems in this class. More specifically, as a boundary moves, a CFD mesh simulating the fluid dynamics can experience mesh cell distortion to the point of cell collapse thereby rendering the CFD mesh meaningless.

SUMMARY OF THE INVENTION

Accordingly, it is an object of the present invention to provide a method of simulating fluid flow in a three-dimensional volume with a moving boundary.

Another object of the present invention is to provide a method of minimizing cell distortion in a computational fluid dynamic (CFD) mesh as a boundary moves in the CFD mesh.

Other objects and advantages of the present invention will become more obvious hereinafter in the specification and drawings.

In accordance with the present invention, a method of simulating fluid flow in a three-dimensional volume with a moving boundary is provided. The moving boundary is provided within a computational fluid dynamics (CFD) mesh. The CFD mesh includes a plurality of mesh points that define three-dimensional mesh cells. At prescribed intervals in time, locations of the mesh points near the moving boundary are revised predicated on known motion characteristics of the moving boundary. During this process, the CFD mesh undergoes distortion at the moving boundary. The distortion of the three-dimensional mesh cells is minimized using an elastic deformation model that does not involve dimensional physical parameters. As a result, a revised CFD mesh is generated. A fluid flow simulation is then computed for the three-dimensional volume using the revised CFD mesh.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
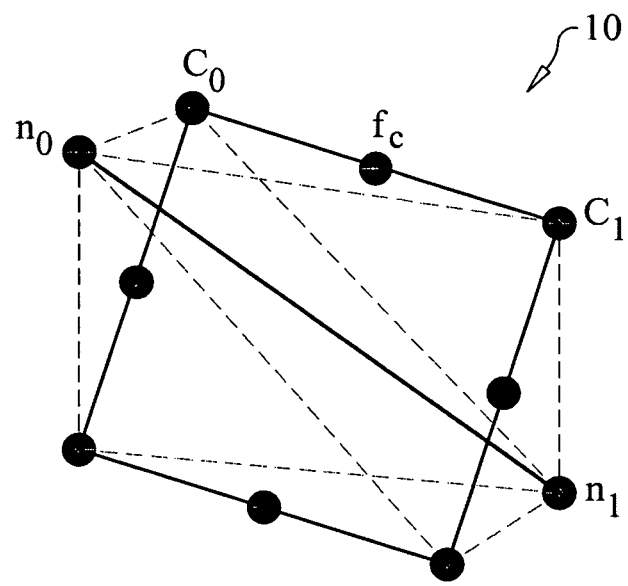
FIG. 1 depicts an exemplary edge volume and its relevant attributes used in the method of the present invention.

The present invention improves fluid flow simulations by minimizing the distortion of three-dimensional cell volumes that make up a computational fluid dynamics (CFD) mesh as a boundary moves in the mesh. By minimizing such cell distortion, the present invention prevents the collapse (or near collapse) of cells rendering that portion of a CFD mesh invalid.

In the present invention, a mesh movement algorithm based on a modified form of the equilibrium equation governing classical linear elastostatics is used to coordinate the movement of mesh points within the computational domain in response to motion at the domain boundary. In order to extend the method to large deformation and/or high Reynolds number flow regimes, two modifications are made to the known Navier equation and its finite volume discretization. The first modification stiffens mesh elements against shear distortion and the second modification stiffens elements against size distortion in response to motion at the domain boundary. The first modification adds a source term to the known Navier equation. The second modification is implemented in the discrete form of the equation. In certain applications of the method, a novel near-wall node blanking procedure can also be applied. The near-wall blanking procedure overcomes a numerical conditioning problem that arises when slip boundary conditions are applied to the modified equilibrium equation at domain boundaries where high aspect ratio cells are used to resolve thin boundary layers.

An attractive feature of the present mesh update method is that the equation governing linear elastostatics involves terms that are identical to terms in the compressible form of the Navier-Stokes equation governing the evolution of the flow. Consequently, the basic method can be readily implemented using an existing discretization of the Navier-Stokes equation as a template. This significantly reduces the development effort required by other methods. Furthermore, once the basic method has been implemented and evaluated, additional features of the method such as the rigid body rotation source term, slip boundary conditions, and high aspect ratio cell blanking may be implemented as needed.

As known in the art, the partial differential equation (PDE) governing the static equilibrium of a homogeneous linear elastic solid in the absence of body forces expressed in terms of displacements is the Navier equation $$\frac{1}{1-2\nu}\nabla(\nabla \cdot u) + \nabla \cdot \nabla u = 0 \text{ in } \Omega(t) \tag{1}$$

where u is the displacement vector measured with respect to an undeformed reference configuration, $\nabla u$ is the displacement gradient tensor, $\nu$ is Poisson's ratio, and $\Omega(t)$ is the time dependent domain.

Solutions to Eq. (1), obtained under appropriate boundary conditions, are used to update the nodal mesh coordinates according to $$x^{n+1} = x^n + u \tag{2}$$

where $x^{n+1}$ and $x^n$ are the nodal coordinates at the current and previous time levels, respectively. For portions of the computational domain boundary subject to prescribed motion, Dirichlet-type boundary conditions are imposed on Eq. (1) according to $$u = g(t) \text{ on } \Gamma_g(t) \tag{3}$$

where g(t) prescribes the displacement of boundary nodes and $\Gamma_g$ is the portion of the domain boundary where g(t) applies. It should be noted that g(t) can be specified either as an explicitly known function of time, for example, in a forced boundary motion problem, or implicitly through the solution of additional constraint equations such as those describing structural equilibrium or free surface flow kinematics. Alternatively, Neumann-type boundary conditions such as surface traction, slip, or symmetry conditions may be imposed on other portions of the domain boundary to accommodate specific problem types, kinematics, and geometries. As an example of a Neumann-type boundary condition, surface traction conditions expressed in terms of a prescribed surface traction vector, may be applied via $$\frac{2\nu G}{1-2\nu}(\nabla \cdot u)\hat{n} + G(\nabla u + u\nabla) \cdot \hat{n} = \hat{t} \text{ on } \Gamma_h(t) \tag{4}$$

where G is the shear modulus, $u\nabla$ is the transpose of $\nabla u$, $\hat{n}$ is the outward boundary unit normal vector, $\hat{t}$ is the surface traction vector, and $\Gamma_h$ is the portion of the domain boundary where the traction vector is applied.

In order to minimize shear distortion and preserve orthogonality along the deformation trajectory of the mesh, the present invention introduces a source term to the Navier equation such that Eq. (1) takes the form $$\frac{1}{1-2\nu}\nabla(\nabla \cdot u) + \nabla \cdot \nabla u = \kappa \nabla \cdot \overline{\nabla u} \text{ in } \Omega(t) \tag{5}$$

where $\overline{\nabla u}$ is a modified displacement gradient tensor defined in Cartesian coordinates by $$\overline{\nabla u} = \begin{bmatrix} 0 & -\frac{\partial v}{\partial x} & -\frac{\partial w}{\partial x} \\ -\frac{\partial u}{\partial y} & 0 & -\frac{\partial w}{\partial y} \\ -\frac{\partial u}{\partial z} & -\frac{\partial v}{\partial z} & 0 \end{bmatrix} \tag{6}$$

and $\kappa$ is a dimensionless parameter defining the contribution the source term plays in the equilibrium flux balance. The choice of each term in the modified displacement gradient tensor is motivated by the form of the conventional displacement gradient tensor and the rotation tensors, $\nabla u$ and $\Omega$, respectively, which are given by $$\nabla u = \begin{bmatrix} \frac{\partial u}{\partial x} & \frac{\partial u}{\partial y} & \frac{\partial u}{\partial z} \\ \frac{\partial v}{\partial x} & \frac{\partial v}{\partial y} & \frac{\partial v}{\partial z} \\ \frac{\partial w}{\partial x} & \frac{\partial w}{\partial y} & \frac{\partial w}{\partial z} \end{bmatrix} \tag{7}$$

$$\Omega = \begin{bmatrix} 0 & \frac{1}{2}\left(\frac{\partial u}{\partial y} - \frac{\partial v}{\partial x}\right) & \frac{1}{2}\left(\frac{\partial u}{\partial z} - \frac{\partial w}{\partial x}\right) \\ \frac{1}{2}\left(\frac{\partial v}{\partial x} - \frac{\partial u}{\partial y}\right) & 0 & \frac{1}{2}\left(\frac{\partial v}{\partial z} - \frac{\partial w}{\partial y}\right) \\ \frac{1}{2}\left(\frac{\partial w}{\partial x} - \frac{\partial u}{\partial z}\right) & \frac{1}{2}\left(\frac{\partial w}{\partial y} - \frac{\partial v}{\partial z}\right) & 0 \end{bmatrix} \tag{8}$$

By zeroing out the diagonal (dilation) terms and replacing the off diagonal (shear) terms in $\nabla u$ by terms that are consistent with a rigid rotation, the modified displacement gradient tensor introduces an additional contribution to the equilibrium flux balance such that the resulting displacement field approximates a rigid body rotation. For general boundary motion, the equilibrium displacement field is not a rigid body displacement field and the equilibrium displacements will exhibit both shear and size distortion. The source term in Eq. (5) serves to bring about minimization of the shear distortion of the mesh cells to the extent possible under general prescribed boundary motion. Consequently, in situations where orthogonality needs to be preserved along the mesh's deformation trajectory (e.g., boundary layers or other regions where flow gradients are strongly directionally biased), the tendency of solutions to Eq. (5) to resemble rigid body rotation reduces shear distortion in the mesh and allow a moving/deforming mesh approach to be extended to flow simulations involving large boundary motion while resolving thin shear layers in moderate and high Reynolds number flows.

To solve the PDE presented in Eq. (5), a numerical method such as a finite element method can be used. By way of example, edge formulas for a vertex centered finite volume implementation will be described below.

Integrating Eq. (5) over a dual control volume gives the modified Navier equation in weak form as $$\frac{1}{(1-2\nu)}\oint_{\Omega(t)} \nabla(\nabla \cdot u)d\Omega + \oint_{\Omega(t)} (\nabla \cdot \nabla u)d\Omega = \kappa \oint_{\Omega(t)} (\nabla \cdot \overline{\nabla u})d\Omega \tag{9}$$

where $\Omega(t)$ is a vertex-centered dual control volume. Applying Gauss's theorem to the first term and the divergence theorem to the remaining terms transform Eq. (5) to a finite volume form as $$\frac{1}{(1-2\nu)}\oint_{\Gamma(t)} (\nabla \cdot u)n\, d\Gamma + \oint_{\Gamma(t)} (\nabla u \cdot n)d\Gamma = \kappa \oint_{\Gamma(t)} (\overline{\nabla u} \cdot n)d\Gamma \tag{10}$$

where $\Gamma(t)$ is the dual control volume boundary and n is a unit normal vector outward to $\Gamma(t)$. Following notation adopted for a point iterative solution of the discrete equations, the residual, R, for the modified Navier equation in finite volume form is cast as $$R = Au - b \tag{11}$$

where A is the diagonal coefficient of u and b contains source terms as well as off-diagonal neighbor contributions to the equilibrium flux balance.

The Gauss-Seidel (GS) iteration can be used to solve the discrete equilibrium condition expressed by Eq. (11).

Using an edge-based assembly procedure, each edge in the mesh makes contributions to A and b with valid expressions for the discretization available only after all edges in the mesh have contributed and all dual control volumes have been closed. This numeric approach will be explained below with the aid of FIG. 1 where a numerical stencil and edge volume 10 used in the discretization of the modified Navier equation are presented. By way of example, edge volume 10 is shown for a uniform structured brick mesh. In FIG. 1, edge volume 10 is depicted by dashed lines. An exemplary edge is depicted by a bold line connecting nodes $n_0$ and $n_1$. An exemplary edge normal is depicted by the solid-line square that includes four element (or cell) centers (two of which $c_0$ and $c_1$ are labeled), and four face centers (one of which $f_c$ is labeled). These references will be used to describe the numerical approach used to solve Eq. (5).

The per-edge contributions to the diagonal coefficient and source term are given below for the dilation, diffusion and rotation terms in Eq. (10). In the following edge formulas, $\nabla u$ is evaluated using Gauss's theorem and the summation takes place over all cell faces sharing an edge:

For the dilation term $$\frac{1}{(1-2\upsilon)}\nabla(\nabla\cdot u)$$

assembling at node $n_0$ yields what will be referred to as Eq. (12):

$$a = 0$$
$$a_{nbr} = 0$$
$$b = \left(\frac{1}{1-2\upsilon}\right)\left(\frac{1}{3\Omega_e}\right)(u_{n1}\cdot n_e - u_{n0}\cdot n_e + \sum[(u_{c0}+u_{fc})\cdot$$
$$(n_0^f + n_0^b) + (u_{c1}+u_{fc})\cdot(n_l^f + n_l^b)])n_e$$

assembling at node $n_1$ yields what will be referred to as Eq. (13):

$$a = 0$$
$$a_{nbr} = 0$$
$$b = -\left(\frac{1}{1-2\upsilon}\right)\left(\frac{1}{3\Omega_e}\right)(u_{n1}\cdot n_e - u_{n0}\cdot n_e + \sum[(u_{c0}+u_{fc})\cdot$$
$$(n_0^f + n_0^b) + (u_{c1}+u_{fc})\cdot(n_l^f + n_l^b)])n_e$$

For the diffusion term $\nabla\cdot\nabla u$
assembling at node $n_0$ yields what will be referred to as Eq. (14)

$$a = \left(\frac{1}{3\Omega_e}\right)(n_e\cdot n_e)$$
$$a_{nbr} = \left(\frac{1}{3\Omega_e}\right)(n_e\cdot n_e)$$
$$b = \left(\frac{1}{3\Omega_e}\right)\sum[(u_{c0}+u_{fc})(n_0^f + n_0^b) + (u_{c1}+u_{fc})(n_l^f + n_l^b)]\cdot n_e$$

assembling at node $n_1$ yields what will be referred to as Eq. (15)

$$a = \left(\frac{1}{3\Omega_e}\right)(n_e\cdot n_e)$$
$$a_{nbr} = \left(\frac{1}{3\Omega_e}\right)(n_e\cdot n_e)$$
$$b = -\left(\frac{1}{3\Omega_e}\right)\sum[(u_{c0}+u_{fc})(n_0^f + n_0^b) + (u_{c1}+u_{fc})(n_l^f + n_l^b)]\cdot n_e$$

For the rotation term $\kappa\nabla\cdot\overline{\nabla u}$
assembling at node $n_0$ yields what will be referred to as Eq. (16)

$$a = 0$$
$$a_{nbr} = 0$$
$$b = -\left(\frac{\kappa}{2}\right)(\nabla u_{n0} + \nabla u_{n1})n_e$$

assembling at node $n_1$ yields what will be referred to as Eq. (17)

$$a = 0$$
$$a_{nbr} = 0$$
$$b = \left(\frac{\kappa}{2}\right)(\nabla u_{n0} + \nabla u_{n1})n_e$$

The present method uses an edge-based procedure to assemble the discrete equations presented above. Size stiffening is implemented by modifying the edge volume, $\Omega_e$, appearing in the edge formulas (Eqs. (12)-(15)) according to $$\left(\frac{1}{\Omega_e}\right) \Rightarrow \left(\frac{1}{\Omega_e}\right)\left(\frac{\Omega_e}{\Omega_{ref}}\right)^{-\chi} \quad (18)$$

where $\chi$ is a size stiffening parameter, $\Omega_e$ is the edge volume shown in FIG. 1, and $\Omega_{ref}$ is an arbitrary reference edge volume. For consistency, the same size stiffening treatment is applied to the discretization of the new source term in Eqs. (16) and (17) since the edge volume does not appear naturally in those formulas.

Inspection of Eqs. (5) and (18) reveals that, for a specified boundary motion, the solution to the modified Navier equation presented herein depends on three nondimensional parameters, $\upsilon$, $\chi$, and $\kappa$, corresponding to Poisson's ratio, a size stiffening parameter, and a rotation parameter, respectively. When $\chi$ and $\kappa$ are zero, Eqs. (5) and (18) reduce to the system governing the static response of a homogeneous linear elastic solid to imposed displacement and/or traction boundary conditions. When $\kappa$ is zero and $\chi$ takes on a value greater than zero, the discrete system mimics the behavior of a nonhomogenous linear elastic system where the local material stiffness has been increased by a factor $(1/\Omega_e)^{\chi}$. The overall effect of this size stiffening is to cause small control volumes to remain relatively constant in size while exporting the bulk of the deformation to regions with larger cell sizes where deformation can be more readily tolerated without severely degrading the mesh quality.

In classical elasticity, the assumption of small displacements, small strains and a linear elastic material model results in a strictly linear boundary value problem that may be solved directly for a unique displacement field, u. Although the basis of the present method is linear, the extension to large displacements is made by assembling the discrete form of the linear equations at the n+1 time level and marching along a nonlinear deformation trajectory using a sequence of quasi-linear solutions at each time level. By assembling the discrete form of the equilibrium equation using the current $x^{n+1}$ mesh configuration, the present invention prevents the collapse of small cells by stiffening elements against size and shear distortion based on their current size within each time level.

The CFD mesh update (necessitated by boundary movement) resulting from the above-described process coordinates the movement of nodes from one time step to the next thereby preventing mesh cell collapse. The CFD mesh updates are provided to a fluid flow simulation routine as would be understood in the art. The particular choice of fluid flow simulation routine is not a limitation of the present invention. Some examples of suitable simulation routines that could use the present method are any commercially available CFD software products such as FLUENT, AVSYS, CFX, CFD++, and Star-CCM.

Figure 2:
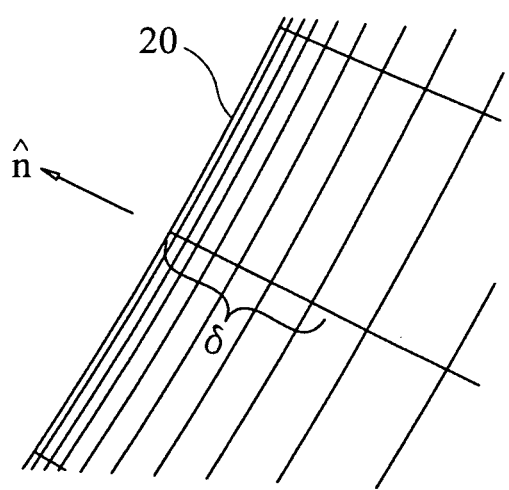
FIG. 2 depicts a portion of a wall boundary and the near-wall mesh adjacent thereto.

Situations can arise in flow simulation applications where it is desirable to have mesh nodes slide or slip along a portion of the domain boundary. One example of this situation is where a wall boundary intersects a free-surface boundary (e.g., a ship's hull in water). In this situation, wall nodes must migrate in a coordinated fashion along the wall boundary to accommodate free surface motion as dictated by the free surface boundary condition. A prescription for a slip (i.e., zero tangential stress) boundary condition can be constructed that mimics the influence of Eq. (4) but avoids the need to introduce a dimensional material property into the formulation. Referring to FIG. 2, a wall boundary is shown at bold line 20. The near-wall mesh in the fluid region is depicted adjacent to boundary 20. For the near-wall mesh shown in FIG. 2, the wall node displacement, $\hat{u}$, is given by $$\hat{u} = u^* - (u^* \cdot \hat{n})\hat{n} \qquad (19)$$

where $\hat{n}$ is the boundary unit normal vector, and $u^*$ is the wall node displacement vector computed from the discrete form of Eq. (5) as if it were an interior node.

For isotropic near-wall meshes, the prescription given by Eq. (19) works well and produces a coordinated migration of wall bounded nodes and nearby interior nodes that mimics a shear free boundary condition. However, for the high aspect ratio near-wall mesh shown in FIG. 2, the discrete form of the modified Navier equation becomes ill conditioned and an alternate near-wall treatment is needed.

To accommodate this situation, a novel variant of the prescription given above in Eq. (19) for sliding wall nodes can be used for high aspect ratio near-wall cells and is given by $$\hat{u} = u^* - (u^* \cdot \hat{n})\hat{n} \text{ when } d < \delta \qquad (20)$$

where now $u^*$ is the displacement of the nearest interior node outside the blanking zone, d is the distance of an interior node to the nearest wall node, and $\delta$ is a nondimensional blanking distance. Applying Eq. (20) to all wall bounded and near-wall nodes within the blanking zone results in locally tangent rigid body motion of the collection of interior nodes nearest to a particular wall node. The rigid body displacement is dictated by the local boundary node unit normal and the displacement of the nearest interior node outside of the blanking zone.

The advantages of the present invention are numerous. The modified form of the Navier equation governing classical linear elastostatics produces high quality meshes for a variety of flow problems with moving and deforming boundaries. The method can be readily implemented in an existing flow solver by taking advantage of the formal similarity between the method's modified Navier equation and the compressible Navier-Stokes equation. The application of the method relies only on the choice of nondimensional parameters that can be used to tailor the mesh solutions to specific and potentially diverse flow problems involving moving domain boundaries. The present method avoids the introduction of any dimensional quantity into the formulation such as the elastic modulus. The absence of any dimensional material quantity in the formulation means that the displacement solution to any homogeneous linear elastic boundary value problem is independent of the elastic, shear, or bulk modulus when displacement boundary conditions are applied.

The method effectively uses a cell size-based stiffening to minimize mesh distortions during the flow solution. In particular, elements stiffen as they shrink to prevent small cells from collapsing while cell elements soften as they grow. This is a result of using cell volume as the basis for locally stiffening the mesh and is an inherent nonlinearity of the method. Because of this nonlinearity, when the boundary motion is periodic and there is large relative motion between nodes, the mesh at times t=nT will not be identical to the initial mesh at t=0. Accordingly, mesh nodes respond to large boundary motion much in the same way as an elastic solid when it is strained beyond the elastic limit and displays inelastic behavior. An upper limit can be imposed on each edge volume in an ad hoc fashion in order to limit excessive growth of the larger cells in certain specific situations. Since the present method stiffens cells locally based on the relative size of cells within the mesh, a uniform mesh will be unaffected by the choice of $\chi$ and the prescribed boundary motion will be distributed uniformly throughout the mesh.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of simulating fluid flow in a three-dimensional volume with a moving boundary, comprising the steps of:
   providing a moving boundary within a computational fluid dynamics (CFD) mesh, wherein said CFD mesh includes a plurality of mesh points that define three-dimensional mesh cells;
   revising, at prescribed intervals in time, locations of said mesh points at said moving boundary predicated on known motion characteristics thereof, wherein said CFD mesh undergoes distortion near said moving boundary;
   minimizing distortion of said three-dimensional mesh cells during said step of revising using an elastic deformation model that does not involve dimensional physical parameters,
   wherein said elastic deformation model comprises a modified Navier equation of the form $$\frac{1}{1-2\nu} \nabla(\nabla \cdot u) + \nabla \cdot \nabla u = \kappa \nabla \cdot \overline{\nabla u}$$

where u is a displacement vector, $\nabla u$ is a displacement gradient tensor, $\nu$ is Poisson's ratio, $\overline{\nabla u}$ is a modified displacement gradient tensor defined in Cartesian coordinates by $$\overline{\nabla u} = \begin{bmatrix} 0 & -\frac{\partial v}{\partial x} & -\frac{\partial w}{\partial x} \\ -\frac{\partial u}{\partial y} & 0 & -\frac{\partial w}{\partial y} \\ -\frac{\partial u}{\partial z} & -\frac{\partial v}{\partial z} & 0 \end{bmatrix}$$

and κ is a dimensionless parameter, wherein, when said moving boundary is adjacent a freely moving surface, said displacement vector for said mesh points near said moving boundary is defined by $$\hat{u} = u^* - (u^* \cdot \hat{n})\hat{n}$$

where u* is computed using said elastic deformation model based on ones of said mesh points not at said moving boundary and n̂ is a normal vector at said moving boundary, wherein a revised CFD mesh is generated; and computing a fluid flow simulation for the three-dimensional volume using said revised CFD mesh.

2. The method according to claim 1, wherein said step of minimizing comprises the step of simulating elastic deformation of said mesh points not at said moving boundary.

3. The method according to claim 1, wherein said step of minimizing comprises the steps of:
  minimizing shear distortion of said three-dimensional cells based on the size thereof; and
  minimizing size distortion of said three-dimensional cells based on the size thereof.

4. The method according to claim 1, wherein a discretized form of said modified Navier equation includes an edge volume $\Omega_e$, and wherein said method further includes the step of solving said discretized form of said modified Navier equation by modifying said edge volume $\Omega_e$ in accordance with $$\left(\frac{1}{\Omega_e}\right) \Rightarrow \left(\frac{1}{\Omega_e}\right)\left(\frac{\Omega_e}{\Omega_{ref}}\right)^{-\chi}$$

where χ is a dimensionless parameter and $\Omega_{ref}$ is a reference edge volume.

5. A method of simulating fluid flow in a three-dimensional volume with a moving boundary, comprising the steps of:
  providing a moving boundary within a computational fluid dynamics (CFD) mesh, wherein said CFD mesh includes a plurality of mesh points that define three-dimensional mesh cells;
  revising, at prescribed intervals in time, locations of said mesh points at said moving boundary predicated on known motion characteristics thereof, wherein said CFD mesh undergoes distortion near said moving boundary;
  minimizing shear distortion of said three-dimensional mesh cells and size distortion of said three-dimensional mesh cells during said step of revising using an elastic deformation model that does not involve dimensional physical parameters,
  wherein said elastic deformation model comprises a modified Navier equation of the form $$\frac{1}{(1-2v)}\nabla(\nabla \cdot u) + \nabla \cdot \nabla u = \kappa \nabla \cdot \overline{\nabla u}$$

where u is a displacement vector, ∇u is a displacement gradient tensor, v is Poisson's ration, $\overline{\nabla u}$ is a modified displacement gradient tensor defined in Cartesian coordinates by $$\overline{\nabla u} = \begin{bmatrix} 0 & -\frac{\partial v}{\partial x} & -\frac{\partial w}{\partial x} \\ -\frac{\partial u}{\partial y} & 0 & -\frac{\partial w}{\partial y} \\ -\frac{\partial u}{\partial z} & -\frac{\partial v}{\partial z} & 0 \end{bmatrix}$$

and κ is a dimensionless parameter, wherein, when said moving boundary is adjacent a freely moving surface, said displacement vector for said mesh points near said moving boundary is defined by $$\hat{u} = u^* - (u^* \cdot \hat{n})\hat{n}$$

where u* is computed using said elastic deformation model based on ones of said mesh points not at said moving boundary and n̂ is a normal vector at said moving boundary, wherein a revised CFD mesh is generated; and computing a fluid flow simulation for the three-dimensional volume using said revised CFD mesh.

6. The method according to claim 5, wherein said step of minimizing comprises the step of simulating elastic deformation of said mesh points not at said moving boundary.

7. The method according to claim 5, wherein a discretized form of said modified Navier equation includes an edge volume $\Omega_e$, and wherein said method further includes the step of solving said discretized form of said modified Navier equation by modifying said edge volume $\Omega_e$ in accordance with $$\left(\frac{1}{\Omega_e}\right) \Rightarrow \left(\frac{1}{\Omega_e}\right)\left(\frac{\Omega_e}{\Omega_{ref}}\right)^{-\chi}$$

where χ is a dimensionless parameter and $\Omega_{ref}$ is a reference edge volume.

* * * * *